United States Patent [19]

Spasiano et al.

[11] Patent Number: 4,483,685
[45] Date of Patent: Nov. 20, 1984

[54] MOTOR ISOLATOR PULLEY

[75] Inventors: Anthony D. Spasiano, Old Greenwich, Conn.; Vaclav Jelinek, River Edge, N.J.

[73] Assignee: The Singer Company, Stamford, Conn.

[21] Appl. No.: 477,115

[22] Filed: Mar. 21, 1983

[51] Int. Cl.³ .............................. F16D 3/10; F16D 3/70
[52] U.S. Cl. .................................... 464/83; 464/74
[58] Field of Search .......... 464/69, 81, 82, 83, 464/85, 89, 74, 76, 160, 161

[56] References Cited

U.S. PATENT DOCUMENTS

| | | | |
|---|---|---|---|
| 1,386,000 | 8/1921 | Hume | 464/83 X |
| 2,198,135 | 4/1940 | Strasburg et al. | 74/574 |
| 2,346,467 | 4/1944 | Bills et al. | 112/79 R |
| 2,806,365 | 9/1957 | Henning | 464/74 |
| 2,863,411 | 12/1958 | Peets | 112/220 |
| 3,195,324 | 7/1965 | Sellwood | 464/74 |
| 3,314,512 | 4/1967 | Kerestury | 464/76 X |
| 3,678,708 | 7/1972 | Ernst et al. | 464/17 |
| 4,224,835 | 9/1980 | Bauer | 74/574 |

FOREIGN PATENT DOCUMENTS

| | | | |
|---|---|---|---|
| 2534135 | 3/1976 | Fed. Rep. of Germany | 464/85 |
| 509540 | 4/1957 | Italy | 464/76 |

*Primary Examiner*—Stuart S. Levy
*Assistant Examiner*—Thomas R. Hannon
*Attorney, Agent, or Firm*—William V. Ebs; Robert E. Smith; Edward L. Bell

[57] ABSTRACT

A coupling in the drive train between a sewing machine motor and mechanism for driving the sewing instrumentalities of the machine is provided with resilient bumpers. The coupling is further provided with tangs which interface with the bumpers in a manner that is effective to render the spring rate of the coupling variable and reduce both vibrational effects and impact forces in the machine.

6 Claims, 5 Drawing Figures

MOTOR ISOLATOR PULLEY

DESCRIPTION

BACKGROUND OF THE INVENTION

1. Field of the Invention

The invention relates to rotatable couplings of the kind which are adapted by the inclusion of a flexible member to dampen vibrations and so prevent the transmission thereof unabated to mechanism driven through the coupling.

2. Description of the Prior Art

The power source for a sewing machine is commonly a series commutator motor which is fed from a supply of alternating current, and controlled with a solid state rectifier circuit of the type disclosed in U.S. Pat. No. Re. 25,203, for "Motor Control Circuit" issued July 24, 1962. Excellent speed control is obtainable with circuitry of the kind indicated, however, harsh pulses are experienced due to the chopped nature of the electrical wave form, and considerable noise is generated in the machine as a result.

It is a prime object of the present invention to reduce noise in a sewing machine due to rapid accelerations and decelerations of the motor drive shaft as occasioned by the operation of motor control circuitry.

It is another object of the invention to provide a flexible coupling in which the spring rate is variable in a manner enabling the coupling to substantially reduce input noise and vibration in mechanism driven by a motor acting through the coupling.

Other objects and advantages of the invention will become apparent during a reading of the specification taken in connection with the accompanying drawings.

SUMMARY OF THE INVENTION

Figure 1:
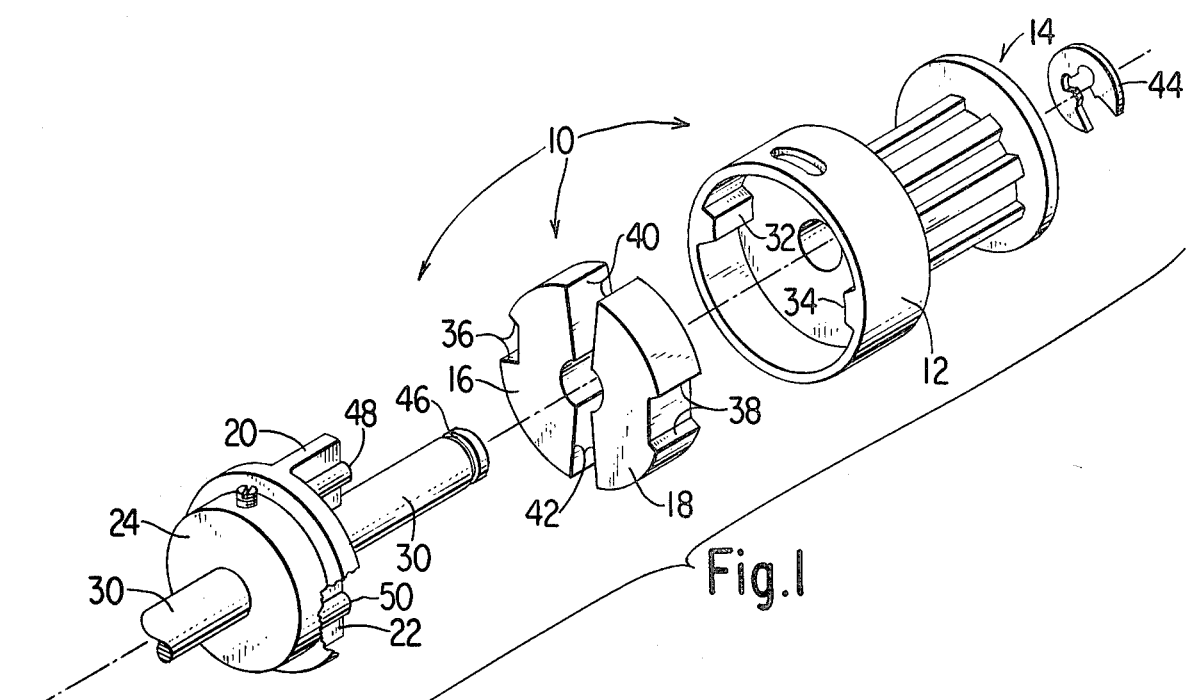
FIG. 1 is an exploded perspective view of the coupling of the invention.
Figure 2:
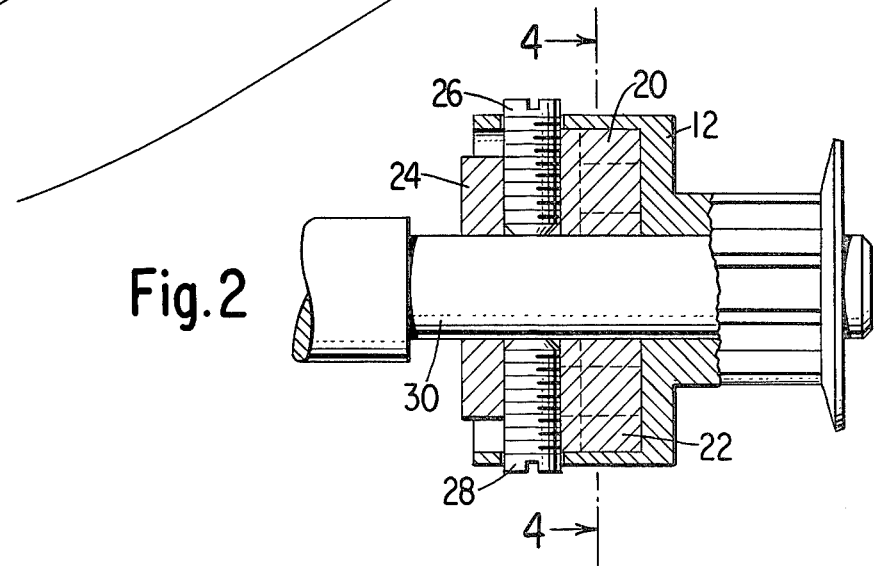
FIGS. 2 and 3 are vertical longitudinal sectional views taken through the coupling on mutually perpendicular planes.
Figure 3:
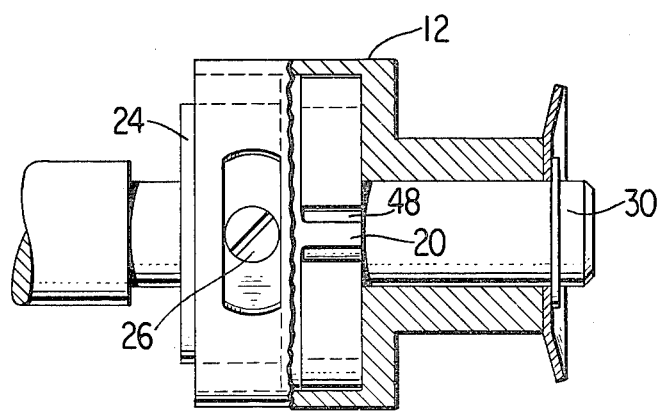
Figure 4:
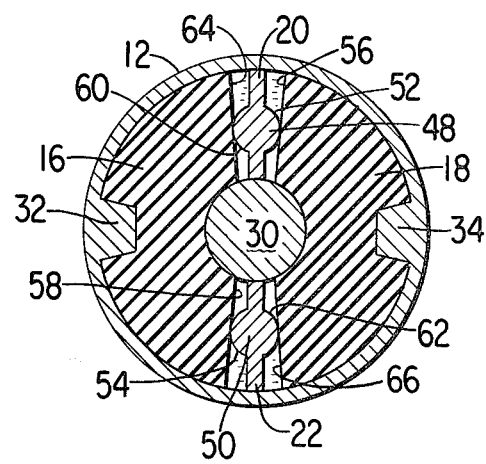
FIG. 4 is a cross-sectional view taken on the plane of the line 4—4 of FIG. 2.

A drive coupling is provided with resilient bumpers, and with tangs which extend between the bumpers to provide for the transmission of power through the coupling. Surface portions of the tangs interface with and engage increasing areas of the bumpers with the application of increased torque to the coupling, and are so configured as to provide for a step increase in the spring rate of the coupling at a predetermined torque. Whenever torque peaks to a value exceeding the predetermined torque, the spring rate is increased to render the coupling effective to absorb the impact, but between the peaks and at low loads the spring rate has a low value at which the coupling can absorb ordinary vibrational effects and impact forces due, for example, to the chopped nature of an electrical wave form characteristic of a control circuit associated with the motor.

DESCRIPTION OF THE PREFERRED EMBODIMENT

Referring to FIGS. 1 through 4 of the drawings, reference character 10 designates a coupling according to the invention including a cup 12 shown as part of a belt driving pulley 14, a pair of resilient bumpers 16 and 18 rotationally restrained within the cup, and driving tangs 20 and 22 extending from a hub 24 and operable against the bumpers.

Hub 24 is affixed, as for example, with set screws 26 and 28 to a drive shaft 30 having the bumpers 16 and 18, cup 12 and pulley 14 rotatably mounted thereon. The bumpers 16 and 18 are keyed to cup 12 by lands 32 and 34 which project inwardly into grooves 36 and 38, respectively, in the bumpers. Except for the grooves 36 and 38, bumpers 16 and 18 are cylindrical sectors separated by gaps 40 and 42 wherein the tangs 20 and 22 are located. The coupling is maintained in an assembled relationship with a retaining ring 44 received in a groove 46 in an end position of shaft 30.

Tangs 20 and 22 extend diametrically on opposite sides of hub 24 and are flat sided members except for enlarged portions 48 and 50 formed theron. Such enlarged portions of the tangs are formed to define raised surfaces 52 and 54 operable against bumper surfaces 56 and 58, respectively when the coupling is driven in one direction (clockwise as viewed in FIG. 4), and to define raised surfaces 60 and 62, respectively operable against bumper surfaces 64 and 66 when the coupling is driven in the opposite direction (counterclockwise). The raised surfaces of the tangs are formed so as to engage only small areas on the bumpers when little torque is applied to shaft 30 and to engage larger areas as the torque is increased. The raised surface portions are preferably cylindrical in form as shown. The bumpers 16 and 18 are of a material which is resiliently flexible throughout the operating torque range of the coupling. Rubber is the preferred material for use in their construction although other materials such as a soft resilient polyurethane may also be utilized.

When shaft 30 is turned, a pair of the raised surfaces 52 and 54, or 60 and 62 (dependent upon the direction in which the shaft is turned) sink into opposing surfaces on the bumpers to a degree determined by the magnitude of the applied torque, the bumper material being compressed in the process. Only raised surfaces of the tangs engage the bumpers when applied torque is less than a predetermined value. However, when the predetermined torque is attained, the bumper material is sufficiently compressed to bring the flat portions of the tangs into engagement with the bumpers, and as the torque is further increased, the flat tang portions react against the engaged bumper surfaces compressing the bumper material. At torques less than the predetermined amount, the coupling has a low spring rate, however, a step increase in spring rate occurs when the predetermined torque is exceeded.

While the coupling is being turned with a torque less than the aforesaid predetermined amount and the low spring rate is therefor in effect, the coupling can effectively absorb impact forces due to the chopped nature of an electrical wave form characteristic of a control circuit associated with the motor, and can also effectively absorb all ordinary mechanical vibrations generated in either the motor or mechanism driven by the motor through the coupling. If torque is transiently increased beyond the predetermined value by torsional impact a higher spring rate becomes effective and the coupling is thereby rendered effective to absorb the high impact force. More than a single step increase in spring rate may be provided for with resilient drive tangs 20 and 22. If the tangs are stiff but nevertheless of a resilient plastic material the coupling can operate at a third spring rate and transmit extraordinary torque to mechanism while under extremely heavy load.

Figure 5:
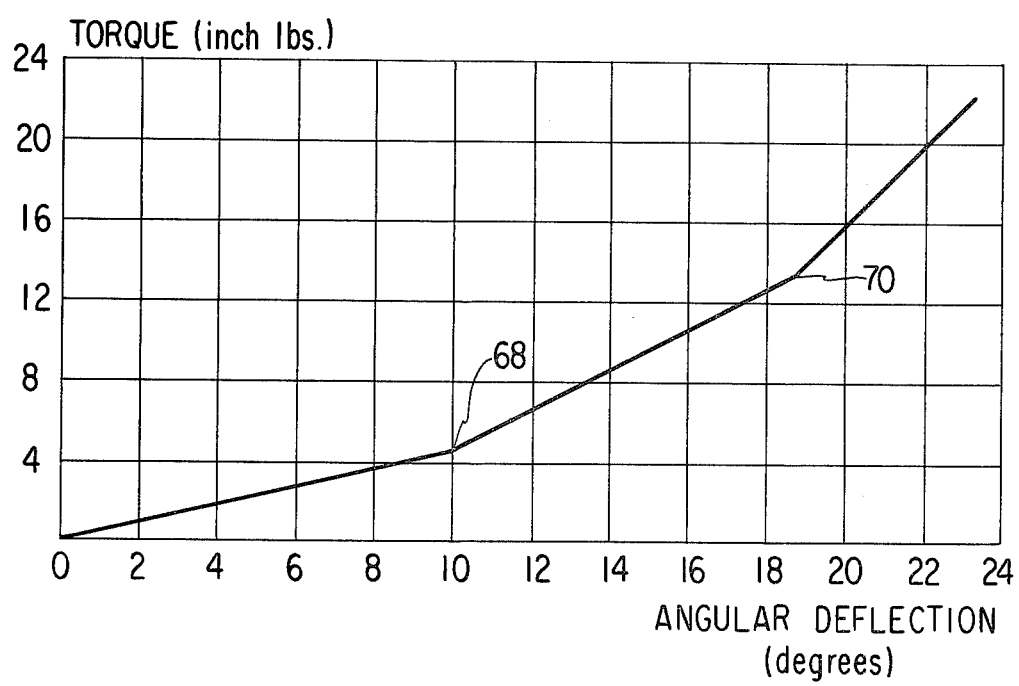
FIG. 5 is a graph illustrating the relationship between torque and angular deflection in the coupling.

Referring to FIG. 5, there may be seen a plot of torque versus relative angular deflection of the hub 24 and pulley 14 for a typical coupling according to the invention with three spring rates defined by the ratio of torque to relative angular deflection. As indicated, step increases occur at 68 and 70.

It is to be understood that the present disclosure relates to a preferred embodiment of the invention which is for purposes of illustration only and is not to be construed as a limitation of the invention. Numerous alterations and modifications of the structure herein disclosed will suggest themselves to those skilled in the art, and all such modifications and alterations which do not depart from the spirit and scope of the invention are intended to be included within the scope of the appended claims.

We claim:

1. A drive coupling including a rotatable cup with inwardly projecting fixed portions, a rotatable hub including stiff fixed tangs which project into the cup where they extend between the inwardly projecting fixed portions of the cup, and a plurality of identical non-metallic resiliently compressible bumpers which extend between said fixed hub tangs and inwardly projecting cup portions, and which constitute the only drive connection between the hub and cup for the transmission of torque therebetween, the tangs being formed with raised portions which alone engage the bumpers whenever less than a predetermined driving torque is applied to the coupling, and with other portions which engage the bumpers when said predetermined torque is exceeded to thereupon significantly increase the area of engagement between the tangs and bumpers and change the spring constant of the bumpers.

2. A coupling according to claim 1 wherein the raised portions of the tangs are curvilinear.

3. A coupling according to claim 1 wherein the raised portions of the tangs are cylindrical.

4. A coupling according to claim 1 wherein the tangs are defined by members extending diametrically on opposite sides of the rotational axis of the hub, and each of the bumpers engages a pair of the tangs but only one of the inwardly projecting cup parts.

5. A coupling according to claim 1 wherein said raised portions of the tangs are curvilinear and said other portions are flat.

6. A coupling according to claim 1 wherein the tangs are resilient.

* * * * *